United States Patent Office 3,278,622
Patented Oct. 11, 1966

3,278,622
PROCESS FOR PREPARING POLYALKYLINDANS
Jan Stofberg, Bertus van der Wal, and Kees N. Nieuwland, Amersfoort, Netherlands, assignors to Polak's Frutal Works, Inc., Middletown, N.Y., a corporation of New York
No Drawing. Filed Mar. 16, 1964, Ser. No. 352,350
Claims priority, application Netherlands, Mar. 21, 1963, 290,503
12 Claims. (Cl. 260—668)

This invention relates to the preparation of polyalkylindans and, more particularly, to the preparation of polyalkylindans having from 3 to 5 alkyl substituents containing from 1 to 3 carbon atoms in the indan or saturated ring. If desired, but not necessarily, an alkyl substituent containing from 1 to 3 carbon atoms can also be present in the benzene nucleus.

Such polyalkylindans are known as intermediates for the production of musk odorants. Acylation to produce the formyl-, acetyl- or propionyl-polyalkylindans results in products having excellent musk odor in the case of alkyl substituted compounds in which the alkyl groups contain 3 or less carbon atoms. Acylated polyalkylindans in which the number of carbon atoms in the alkyl groups is greater than 3, as a general rule, have weaker musk odors than those compounds in which the number of carbon atoms in the alkyl groups is 3 or less.

The musk odorants have the general formula:

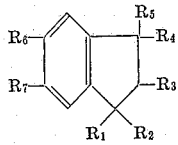

in which $R_1$, $R_2$, $R_3$, $R_4$ and $R_5$ are alkyl groups containing from 1 to 3 carbon atoms or hydrogen with at least three of these substituents being alkyl groups containing from 1 to 3 carbon atoms. $R_6$ is either hydrogen or such an alkyl group, while $R_7$ is an acyl group containing from 1 to 3 carbon atoms. For the production of musk odorants, the 1,1,3,3- and 1,1,2,3,3-alkyl substituted indans are preferred.

In numbering the compound, the 1-position in the above formula is that having the $R_1$ and $R_2$ substituents and the respective positions are numbered counter-clockwise starting with this 1-position.

The reaction of an alpha-alkyl substituted styrene with an alkene in the presence of an acid acting catalyst at temperatures of from −10° to 90° C. to produce polyalkylindans is disclosed in United States Patent 2,851,501 granted September 9, 1958. In this reaction, the styrenes and alkenes tend to polymerize and hence the composition of the reaction product is determined by the equilibria and velocities of at least three possible competitive reactions, namely, the reaction to form polyalkylindans, the reaction to form polyalkyltetralins, and polymerization reactions between the styrenes and alkenes. Those skilled in the art familiar with this reaction have believed that substitution of carbinols for the alkenes in this reaction would tend to complicate the reaction chiefly because a molecule of water has to be split off of the carbinol for the reaction to proceed satisfactorily. This should tend to favor the polymerization of the styrene and the alkene formed by the splitting off of a molecule of water from the carbinol, thus interfering with the desired reaction to produce polyalkylindans, the desired end product.

It is a principal object of the present invention to provide a process of producing polyalkylindans by reacting secondary or tertiary branched chain aliphatic alcohols with styrenes giving good yields of polyalkylindans.

Other objects and advantages of this invention will be apparent from the following detailed description thereof.

In accordance with this invention, a styrene, having the general formula:

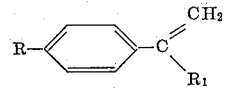

in which R is either hydrogen or an alkyl group containing from 1 to 3 carbon atoms and $R_1$ is either hydrogen or an alkyl group containing from 1 to 3 carbon atoms, is reacted, in the presence of an acid acting catalyst, with a secondary or tertiary branched chain aliphatic alcohol having 4 to 5 carbon atoms in approximately equal molar proportions to produce polyalkylindans in good yield.

The polyalkylindans thus produced when acylated in any conventional manner to produce formyl, acetyl, or propionyl polyalkylindans give products having excellent musk odor.

The preferred styrenes are alpha-methylstyrene, para-alpha-dimethylstyrene and para-ethyl-alpha-methyl styrene. Other styrenes within the above formula can be used.

The preferred alcohols are tertiary butanol, tertiary amylalcohol and methylisopropylcarbinol.

As noted, the condensation of the styrene and the alcohol mentioned is effected in the presence of an acid acting catalyst. Preferred catalysts are mixtures of sulfuric acid and water containing from 5% to 20% by weight of water; mixtures of glacial acetic acid and 66° Bé. sulfuric acid containing from 20% to 80%, preferably about 50% sulfuric acid; and the lower alkane sulfonic acids, such, for example, as methane, ethane and propane sulfonic acids. Mixtures of two or of all three of these alkane sulfonic acids can be used. To minimize polymerization reactions, some water is employed along with the alkane sulfonic acid or mixtures thereof, usually from about 2% to 6% water, preferably about 4% water, based on total mixture of water and alkane sulfonic acid or mixture thereof. In the case of methane sulfonic acid, preferably about 10% water is used. Employing a mixture of methane, ethane and propane sulfonic acids, or any two of these sulfonic acids, from about 2% to 6%, preferably about 4% water can be incorporated in the mixture,.

It is preferred to conduct the reaction at a temperature within the range of from 10° to 60° C. At higher temperatures than 60° C., employing an acid acting catalyst containing or which tends to form sulfuric acid, sulfonation of the alkyl substituted styrene to an objectionable extent may occur. To minimize such sulfonation, employing a mixture of acetic acid and sulfuric acid as the catalyst, it is preferred to operate at about a temperature of from 35° to 40° C. Using the alkane sulfonic acid as the catalyst, a reaction temperature of about 50° C. is preferred.

The reaction between alpha-methylstyrene and methylisopropylcarbinol to form 1,1,2,3,3-pentamethylindan is represented by the equation:

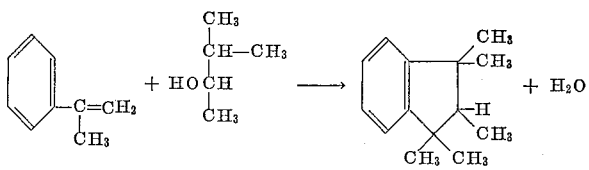

The reaction between alpha-methylstyrene and tertiary amylalcohol to form 1,1,2,3,3-pentamethylindan is represented by the equation:

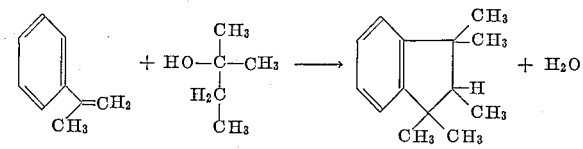

Thus the present invention involves the discovery that styrenes and the alkyl substituted styrenes hereinabove identified react with 4 and 5 carbon atom secondary or tertiary branched chain aliphatic alcohols in the presence of an acid acting catalyst to produce polyalkylindans in good yield. In that this invention involves the use of such alcohols as the reactant for reaction with the styrene compound, it has the advantage that it eliminates the necessity of producing alkenes heretofore used and which are commonly prepared by dehydration of the corresponding alcohol. For this reason the present process results in a saving as compared with the heretofore known procedure involving the reaction of corresponding alkene with an alkyl styrene.

The following examples are given for illustrative purposes with the understanding that the present invention is not to be limited to these examples. These examples were carried out in a round bottom flask equipped with a stirrer, a thermometer, a condenser and a dropping funnel.

*Example I*

To a mixture of 200 grams of glacial acetic acid and 200 grams of sulfuric acid of 96% strength, 132 grams (1 mol) para-alpha-dimethylstyrene and 88 grams (1 mol) tertiary amylalcohol were added over a one hour period; the temperature of the reaction mixture was maintained at 40° C. After another 20 minutes stirring at the same temperature, separation of the layers was effected, followed by washing to neutral of the top layer with sodium hydroxide solution. The crude product upon fractionation yielded a fraction of boiling point 75°–85° C./2 mm. of Hg and consisting of approximately 70% 1,1,2,3,3,5-hexamethylindan and of approximately 30% 1,1,3,5 - tetramethyl-3-ethylindan. The mixture, having $n_D^{20}=1.508-1.511$, can be separated into its components by careful fractionation, but for the production of musk odorants this is not required.

For the acetylation 140 grams (1.05 mols) of anhydrous aluminum chloride were added with stirring to 400 grams (3.25 mols) nitrobenzene keeping the temperature below 30° C. Through the dropping funnel 204 grams (1 mol) of aforesaid indans, dissolved in 85 grams (1.08 mols) acetylchloride were added in three hours at ±20° C. To bring the reaction to completion stirring was continued for another half hour. Thereafter the mixture was poured out into ice and concentrated hydrochloric acid. The resulting liquid, after washing to neutral with sodium acetate solution, was fractionated, to yield 385 grams recovered nitrobenzene and then 200 grams of a liquid, boiling at 116–126° C./0.7 mm. and consisting of 6-acetyl-1,1,2,3,3,5-hexamethylindan and 6 - acetyl-1,1,3,5-tetramethyl-3-ethylindan. On standing the bulk of the product solidified.

*Example II*

From 132 grams (1 mol) para-alpha-dimethylstyrene and 74 grams (1 mol) tertiary butanol, 1,1,3,3,5-pentamethylindan was obtained by the process described in the foregoing example. The crude hydrocarbon, boiling point 62–72° C./2 mm., was purified by another fractionation. It then had a boiling point of 67° C./2 mm. and a refractive index of $n_D^{20}=1.503-1.505$. Acytylation following the process of Example I yielded 6-acetyl-1,1,3,3,5-pentamethylindan, with a boiling point of 112–116° C./1 mm. After recrystallization from ethanol, the product had a melting point of 60–61° C.

*Example III*

Following the conditions, of Example I, the reaction of 146 grams (1 mol) para-ethyl-alpha-methylstyrene, 88 grams (1 mol) tertiary amylalcohol in the presence of 400 grams of acetic acid and sulfuric acid gave 1,1,2,3,3-pentamethyl-5-ethylindan, as a liquid with a boiling point of 85–97° C./2 mm. A second fractionation yielded the pure indan, with a boiling point of 92° C./2 mm. and $n_D^{20}=1.506$.

The conversion to the acetyl derivative following the method of Exampe I resulted in 6-acetyl-1,1,2,3,3-pentamethyl-5-ethylindan. The pure compound has a boiling point of 141° C./2 mm. and a melting point of 74–75° C.

*Example IV*

118 grams (1 mol) alpha-methylstyrene and 88 grams (1 mol) tertiary amylalcohol were reacted with 200 grams glacial acetic acid and 200 grams sulfuric acid (96%) under the conditions of Example I.

A liquid, boiling point 63–72° C./2 mm., the bulk of which was shown by gas chromatography to be 1,1,2,3,3-pentamethylindan, was thus produced. Fractionation through an efficient column yielded the pure hydrocarbon with a boiling point of 67° C./2 mm. and $n_D^{20}=1.511$.

Acetylation, as described in Example I, yielded 5-acetyl-1,1,2,3,3-pentamethylindan as a liquid with a boiling point of 125–129° C./2 mm., that soon solidified. After recrystallization the melting point was 47–48° C.

To prepare the aldehyde, hydrochloric acid gas was bubbled through a mixture of 18.6 grams (0.14 mol) anhydrous zinc chloride, 22.4 grams (0.75 mol) paraformaldehyde and 218 grams (1.15 mols) of 1,1,2,3,3-pentamethylindan, keeping the temperature at about 80° C. After three and a half hours the gas absorption ceased. Separation of the layers and washing to neutral of the top layer with water and dilute sodium hydroxide solution, followed by fractionation under reduced pressure, gave a forerun of recovered pentamethylindan and thereafter 5-chloromethyl-1,1,2,3,3-pentamethylindan, a compound with a boiling point of 118.5–121° C./1.5 mm, $n_D^{20}=1.533$ and $d_4^{20}=1.002$. 5-formyl-1,1,2,3,3-pentamethylindan was obtained by refluxing 37.4 grams (0.17 mol) of this chloromethyl compound with a mixture of 44 grams (0.31 mol) hexamethyltetramine, 65 ml. glacial acetic acid and 65 ml. water. After cooling somewhat, 25 ml. hydrochloric acid (36% strength) was added, and the liquid again refluxed for 20 minutes. The cold reaction mixture was diluted with water and extracted with benzene. Washing to neutral and removal of the solvent by distillation yielded the crude aldehyde. The distilled compound had a boiling point of 119–120° C./2 mm. and after recrystallization from ethanol, a melting point of 48.5–50° C.

*Example V*

A mixture of 132 grams (1 mol) of para-alpha-dimethylstyrene and 88 grams (1 mol) of tertiary amylalcohol was added dropwise to 400 grams methanesulfonic acid (90% methanesulfonic acid, 10% water) over a one-half hour period at ±50° C. Thereafter, stirring was continued for another 15 minutes.

Separation of the layers and washing the top layer to neutral with sodium hydroxide yielded a product that was fractionated under reduced pressure. The bulk of the liquid, a mixture of ±70% 1,1,2,3,3,5-hexamethylindan and ±30% 3-ethyl-1,1,3,5-tetramethylindan boiled from 67–80° C./1.5 mm. of Hg.

The methanesulfonic acid may be replaced by an equal amount of ethane or propane sulfonic acid, or a mixture of two or three of these acids containing about 4% water with substantially the same results.

In this specification all percentages are given on a weight basis.

It is to be understood that this invention is not restricted to the present disclosure otherwise than as defined by the appended claims.

What is claimed is:

1. The process for preparing polyalkylindans which comprises reacting in the presence of an acid acting catalyst, a styrene hydrocarbon having the formula:

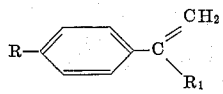

in which R and $R_1$ are selected from the group consisting of hydrogen and an alkyl group containing from 1 to 3 carbon atoms with an alcohol selected from the group consisting of tertiary and secondary branched chain aliphatic alcohols having from 4 to 5 carbon atoms.

2. The process of claim 1, in which the styrene hydrocarbon is para-alpha-dimethylstyrene.

3. The process of claim 1, in which the styrene hydrocarbon is alpha-methylstyrene.

4. The process of claim 1, in which the styrene hydrocarbon is para-ethyl-alpha-methylstyrene.

5. The process of claim 1, in which the alcohol is tertiary butanol.

6. The process of claim 1, in which the alcohol is tertiary pentanol.

7. The process of claim 1, in which the acid acting catalyst is a mixture of glacial acetic acid and sulfuric acid.

8. The process of claim 1, in which the acid acting catalyst is a mixture of sulfuric acid and water containing 80% to 90% by weight of acid.

9. The process of claim 1, in which the acid acting catalyst is methanesulfonic acid.

10. The process of claim 1, in which the acid acting catalyst is ethanesulfonic acid.

11. The process of claim 1, in which the acid acting catalyst is propanesulfonic acid.

12. The process of claim 1, in which the acid acting catalyst is a mixture of at least two of the alkane-sulfonic acids, methane, ethane and propane sulfonic acids and contains from 2% to 6% by weight of water.

References Cited by the Examiner

UNITED STATES PATENTS 2,851,501   9/1958   Benz et al. _____ 260—668

DELBERT E. GANTZ, *Primary Examiner.*

G. E. SCHMITKONS, *Assistant Examiner.*